J. A. GOLDEN.
MOTION PICTURE CAMERA.
APPLICATION FILED NOV. 4, 1916.

1,230,576.

Patented June 19, 1917.
2 SHEETS—SHEET 1.

WITNESSES:
Ralph A. Hoffman
David M. Logan

INVENTOR
Joseph G. Golden
BY
A. Press
ATTORNEY

J. A. GOLDEN.
MOTION PICTURE CAMERA.
APPLICATION FILED NOV. 4, 1916.

1,230,576.

Patented June 19, 1917.
2 SHEETS—SHEET 2.

WITNESSES:
Ralph A. Hoffman
David M. Logan

INVENTOR
Joseph A. G. Golden
BY
G. Press.
ATTORNEY

UNITED STATES PATENT OFFICE.

JOSEPH A. GOLDEN, OF NEW YORK, N. Y.

MOTION-PICTURE CAMERA.

1,230,576.  Specification of Letters Patent.  Patented June 19, 1917.

Application filed November 4, 1916. Serial No. 129,528.

*To all whom it may concern:*

Be it known that I, JOSEPH A. GOLDEN, citizen of the United States, and resident of New York, in the county of New York and State of New York, have invented certain new and useful Improvements in Motion-Picture Cameras, of which the following is a specification.

This invention relates to motion picture cameras for amateur use, and particularly to such cameras as make use of standard kodak films. One of the objects of the invention is to obtain a light, compact, and very simple mechanism which will enable the amateur to take motion pictures with the least amount of trouble, skill and expense. Heretofore, proposed motion picture cameras have been burdened with such a multiplicity of parts as to make the initial expense prohibitive for the amateur, or the cameras have been so bulky that considerable inconvenience has had to be put up with in transporting or even in handling the motion picture cameras. It is essential that the camera be compact, and therefore, one of the principal objects of the invention is the provision of a mechanical drive for the spools carrying the film wherein the parts have their motions in a plane substantially parallel with that of the carrier of the film. By this means it is possible to secure a compact construction which would be impossible with mechanisms having movements whether at right angles or even oblique to that of the carrier travel.

Another particular object of the invention is, firstly, the provision of a means for moving the spool carrier in a stepped oscillatory manner in a plane, and secondly, by providing an escapement mechanism whereby reeling and un-reeling of the film takes place in a cyclic manner, after the film carrier has performed a predetermined number of stepped movements. By providing a rib, which is free on both sides, to the walls of the camera, it is possible to provide not only means for taking the pictures with the least amount of complication, but also one is thereby enabled to quickly transform the camera into a projecting motion picture machine. By providing a yoke which engages with the spool carrier plate, it is possible to attach the working parts of the camera to the containing shell with the least amount of difficulty. Moreover, by virtue of the rib above mentioned, a free available space is afforded whereby it is possible to make the changes in the use of the camera as well as the changes necessary for insertion and withdrawal of the film from the camera.

A special feature of the camera is the provision of the escapement control for a spring tensioned winding drive for the take-up spool, whereby the film is always under tension while passing by the slot provided for the exposure of the film to the source of light. Such tension is brought about by having the escapement control operate on a holding drum for the film, which drum is in opposition to the take-up spool on the farther side of the aforementioned exposure slot.

Other features and objects of the invention will become manifest from the description when taken in conjunction with the accompanying drawings.

Figure 1. This is a side view of the working mechanism of the motion picture camera showing the arrangement of yoke and the cam drive for the spool plate mechanism, taken along the line 1—1 of Fig. 2.

Figure 1:
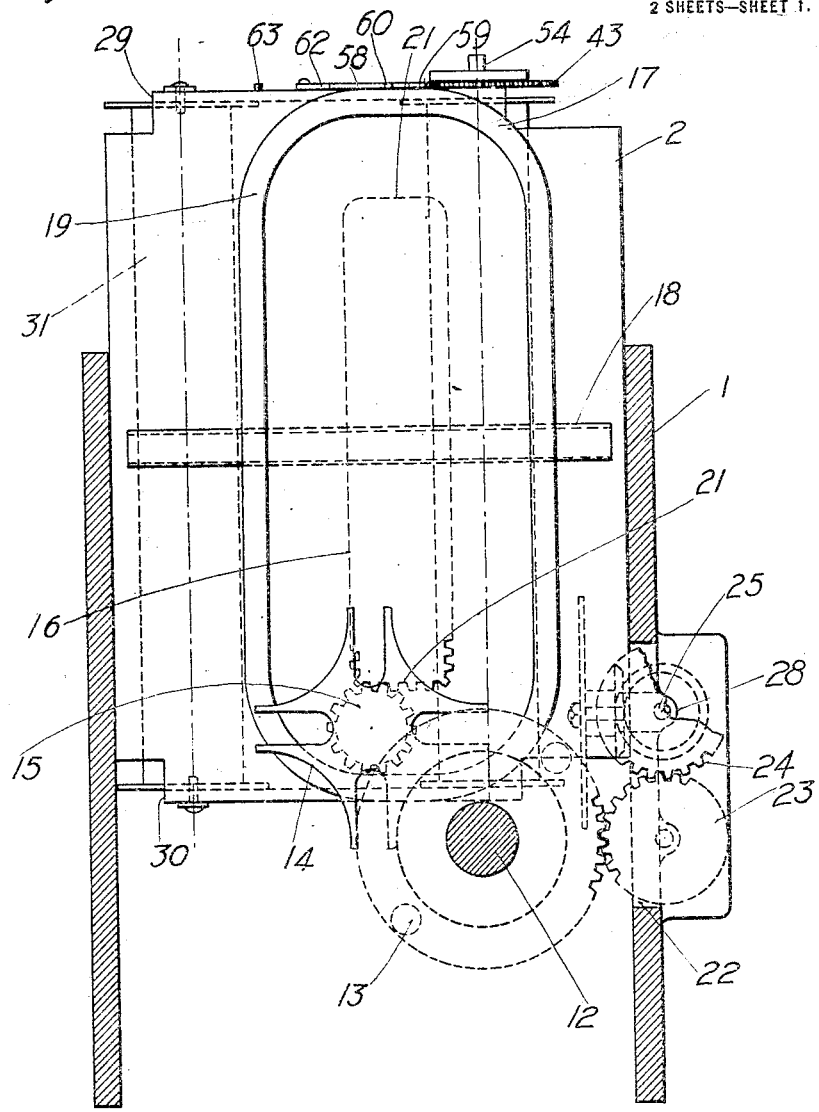

Referring to Fig. 1: A yoke, 1, is provided in which a spool carrier plate, 2, is arranged to slide within guideway 3. A rib, 4, extends from the plate, 2, at right angles and an exposure slot, 5, is cut out from said rib, extending to almost the entire length of the plate 2, in order that light emanating from sources 6 and 7 can reach a film, 8, which normally is arranged to slide vertically and in an oscillatory manner, step by step within the yoke, 1.

Ordinarily I provide a lens to fit in to the light source, 6, in order to properly concentrate the light rays upon the film when operating on the latter to take a photographic record of any desired scene. On the other hand, the light source means, 7, would ordinarily be employed for projecting purposes and which, in the nature of things, would consist of any suitable lamp or light employed in such work. I have not indicated the lens mount or the light projecting sources in conjunction with my camera since such features of themselves do not constitute the subject of my invention. However, I have indicated by dotted lines the paths that would be taken by light rays emanating from a given lighted-up scene. The center of the lens is indicated by the numeral 10, and a shutter, 11, is provided in the path of said light rays in order to periodically shut off the light from the film during the travel of the latter. A shaft for a handle, 12, is indicated, cross section in Fig. 1, and upon said shaft I mount the pin wheel, 13, which engages with a star wheel, 14, having a pinion, 15, engaging with a substantially rectangular rack, 16, forming part of a cam plate structure 17, which is arranged to move in a lateral manner with regard to the carrier plate 2, by means of a wedge interconnection 18. Such wedge, 18 is affixed to the plate 2 and would fit into a slot formed in the cam plate 17.

Substantially parallel with the rack 16 is a retaining wall 19, which determines the up and down as well as the lateral travel of the cam plate with respect to the yoke of the camera. By having the shaft 12 and star wheel and pinion 15 and 16 mounted in the yoke 1, which latter is attached to the wall, 20, of the camera, it will be seen that carrier plate 2, must necessarily take a step by step movement along the guide way, 3, by virtue of the rolling motion of the pinion 15, with respect to the rack 16, which is able to move laterally along the wedge interconnection 18, as well as to move up and down together with the plate 2.

It will be observed that normally the cam plate moves up and down together with the carrier plate, but that at the end of its travel in either direction, the cam plate not only moves one way or another in the direction of the carrier plate, but travels sidewise with respect to the carrier plate when the pinion 15 is rolling along the rack paths, 21, by virtue of the retaining wall, 19, being in substantial parallelism with the rack 16.

The yoke, 1, is provided with a pinion slot, 22, so that a gear train, 23, 24, may be actuated by the teeth of the pin wheel, 13. The gear 24 of the train is mounted on a shaft, 25, which passes through a boss 28, integral with the yoke 1. On the said shaft is a bevel, 26, intermeshing with a similar bevel at right angles, to which the shutter 11 is attached.

Figure 2:
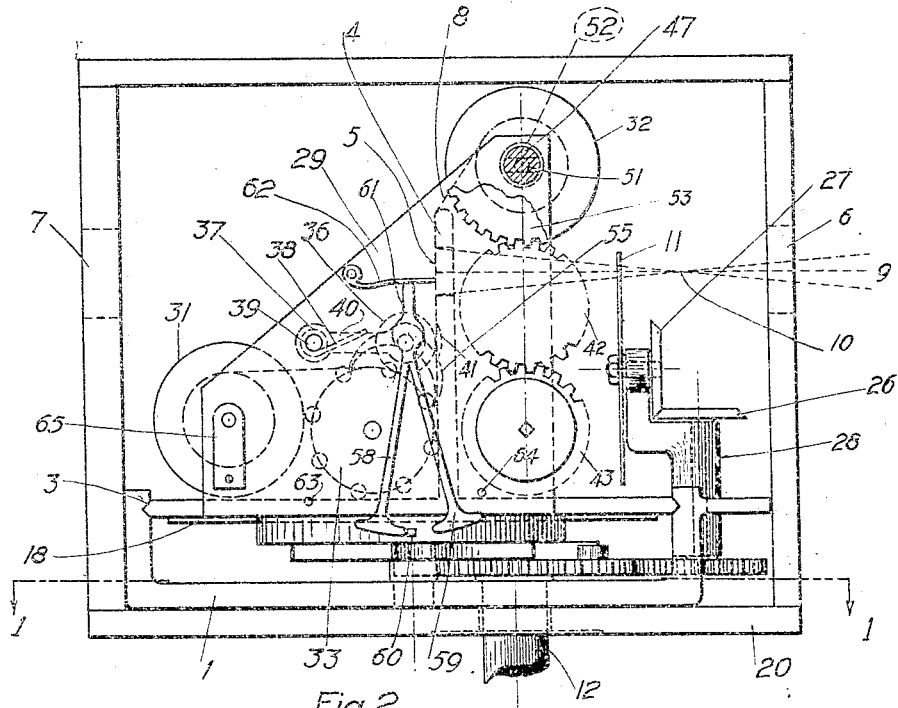
Fig. 2 is a plan view of the camera with the top removed, showing the general arrangement of parts and particularly the escapement control.
Figure 3:
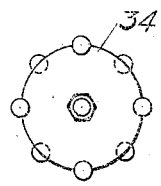
Figs. 3 and 4 are side and end views of the escapement wheel.
Figures 4, 5:
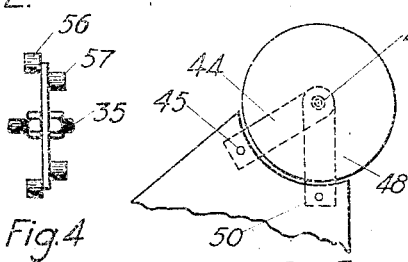
Figs. 5 and 6 show parts of the arrangement provided for the insertion and taking out of the take-up spool.
Figure 6:
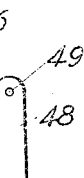

The top and bottom of the carrier plate structure consists of spool holding walls, 29, and 30, in which spools 31 and 32 are mounted. The said spools are arranged with their axes parallel with the direction of travel of the carrier plate. Again, a film drum, 33, also has its axis parallel to those of the aforesaid spools and has an escapement wheel 34, mounted on the shaft 35, carrying the film drum, which latter engages with a similar film drum, 36, held in tensioned engagement with the former drum by means of any suitable spring retaining device such as 37. The film 8, on leaving the spool 31, passes between the two film drums 33 and 36, and then passes over the surface of the rib 4. In order thereafter to be led on to the take-up spool 32, it is mounted preferably on the opposite side of the rib to which the spool 31 happens to be. The spring tensioning device in one form may consist of a spring 38 wound upon a pin, 39, which latter carries a link, 40, provided for mounting the film drum 38; thus, by the spring 38 engaging with the link 40, any degree of tension can be arranged, to be exerted upon the escapement wheel film drum 33, by the film drum 36. The rib 4 is also preferably arranged with a groove, 41, in order that the drum 36 may bring the film slightly below the normal surface of the rim. By this means, when tension is put upon the take-up spool 32, by means of a clock spring train, 42, 43, the film will not only be tensioned across the exposure slot 5, in the rib, but will tend to become perfectly flat with the surface of such rib. The take-up spool 32 is provided on the lower portion of the spool carrier structure with a movable lug, 44, mounted by means of a pin 45 to the plate carrier device and having a hollow carrier pin 46 sticking out from said lug in order that the hollowed out mandrel, 47, may be engaged thereby. However, in order to retain the lug 44 in proper position with respect to the carrier plate, a spring clip 48 also carrying a pin, 49, though smaller than the pin 46 is provided, which latter pin is intended to engage within the hollow carrier pin 46, and thereby locks the lug 44 in position whenever the clip 48 is suitably swung around into position about the stud 50 made integral with the lower portion of the carrier plate structure. At the top of the plate structure I provide the usual retaining lug 51, which is of substantially T form, which lug has a collar 52 on its low side on the other side of the figure as shown in Fig. 2. In order to retain a gear wheel 53 intermeshing with the train 42, 43 arranged on the top of the wall 29, the gear 43 of the train consists of the clock spring mechanism, well known in the clock making art. For this reason the internal structure of the spring need not be specifically described.

A square headed key pin 54 is provided in the usual manner for winding up the clock spring.

The escapement wheel, 34 is controlled by means of a two-armed pawl 55, which spans the distance of two teeth. However, one of the arms is so arranged that it engages a lower pin 56, whereas the corresponding other arm, engages an upper pin 57. Attached to said pawl are two controlling lever arms, 58 and 59. The lever arms 58 and 59 are controlled by a cam plate boss 60, in such a manner that when the cam plate at the end of its upper travel proceeds to go in a lateral direction, it moves one of the arms 58, in order to allow the escapement wheel to move the distance of one pin, whereas on the rear movement of the cam plate position at the extreme downward travel of the spool carrier plate the boss engages with the lever 59 and thereby allows the escapement to move a farther distance of a pin. The pins 56 and 57 are so arranged on the escapement wheel that they correspond to the width of a picture on the film. The pawl structure 55—59 also has an extension 61, which engages with a spring plate, 62, so that when the boss 60 moves the lever arm a very small distance, the spring plate 62 endeavors to make the arms move either to the right or left in order that they may engage with either of the stops 63 or 64, mounted on the wall 29 of the carrier plate structure. In order to facilitate the demountability of the spool 31, two spring clips, similar to 65 are mounted upon the upper and lower walls 29—30, in order that the mandrel of the spool may be engaged to hold the same in the required position.

The mechanism operates as follows: By turning the shaft 12 by means of a handle not shown, the pin wheel structure 13 engages with the star wheel, 14, in order to cause the pinion 15 to rotate and thereby cause the cam plate 17 to roll around the said pinion in such a way that the cam plate, by, firstly traveling upward, carries the spool plate structure with it and then on its extreme movement one way or the other, causes the cam plate to describe a certain amount of motion without giving any corresponding movement to the cam plate structure. The idle periods for the spool plate structure correspond to the movement of the rack by virtue of the rack paths, 21, engaging with the star wheel pinion 15. Such lateral motion of the cam plate is made possible by virtue of a tongue or wedge interconnection integral with the cam plate 2, and engaging with a slot made in the cam plate structure. On the other hand, by virtue of the continuous motion of the shaft 12, a gear train causes the shutter 11 to continually rotate in the direction of the path of the rays indicated by character 9 in Fig. 2. A slot is provided in a rib, 4, extending from the spool plate so that light may be cast from either face of the rib, in order that the camera may be used not only for taking pictures but also for projecting them.

On the other hand, a spring clock train 43—42—52 is provided for the take-up spool 32 in order that a film, 8, may be tensioned along the rib by having the latter pass between two drums 33, 36, which are in the path of the film, passing from the spool 31. The spool drum 33 is provided with an escapement device having levers 58 and 59 in the path of a boss, mounted on the cam plate structure. It is seen that with the lateral oscillation of the cam plate at the extreme ends of its path, it enables the take-up spool to reel up an amount substantially equal to the width of the slot. Thus, the camera is devised for taking a series of pictures in zig-zag fashion across the film and whereas one movement across the width of the film is directly due to the Geneva stop movement directly driven by the handle, the take-up of the film is made to depend upon a clock spring device which is released by virtue of an escapement mechanism at the two extreme ends of the travel of the spool plate carrier during an idle period which corresponds to the shifting of a set of pictures in one column with respect to a column of pictures about to be formed on the same film.

Having described the nature and object of my invention, I hereby claim:

1. In combination, means for moving a film spool carrier back and forth by a step by step motion and automatic tensioning means for winding up a film a predetermined amount on the film spool carrier when reaching the extreme end of its travel.

2. In combination, a film spool carrier, stationary means for the direction of light upon said spool carrier, means for moving said spool carrier step by step, and tensioning means released by said last named means for taking up a predetermined amount of film mounted on said spool carrier.

3. In combination, a film spool carrier, means for linearly moving said spool carrier step by step, and tensioning means cyclically released by said first named means for taking up a predetermined amount of film mounted on said spool carrier.

4. In combination, a film spool carrier, means for guiding said carrier to take a planar movement, an actuating step by step mechanism for moving said carrier having all the motions of its parts in a plane parallel to that of the film spool carrier and a film reeling and unreeling device mounted on said carrier actuated cyclically by said actuating mechanism after a predetermined number of movements of said spool carrier.

5. A motion picture camera comprising a spool carrier plate, a guide for said plate, a cam plate, and means to move the cam plate integrally with the spool plate in one direction and independently of the spool plate in another direction.

6. A motion picture camera comprising a spool carrier device, a guide for said device, a cam plate, means to move the cam plate integrally with the spool plate back and forth with a step by step motion, and further means for moving the cam plate independently of the spool plate by the continued motion of the first named means.

7. A motion picture camera comprising a spool carrier device, a guide for said device, means for moving the carrier device back and forth with a step by step motion, an escapement film winding mechanism and means for tripping the mechanism when the carrier device reaches the extreme limits of its travel.

8. A motion picture camera comprising a spool carrier device, a positive drive means for moving the carrier device back and forth by a step by step motion, and a spring drive film winding mechanism on said spool carrier device having an escapement control actuated intermittently and cyclically through the positive drive means.

9. In a motion picture camera means for giving to a pair of spools a back and forth movement step by step through a positive mechanical drive and a motor having an escapement control actuated intermittently and cyclically through the positive mechanical drive for winding and unwinding the spools.

10. A motion picture camera comprising a spool carrier drive, a guide for said device, a cam plate, means to move the cam plate integrally with the spool plate back and forth with a step by step motion, further means for moving the cam plate independently of the spool plate by the continued motion of the first named means, an escapement film winding mechanism, and means for tripping the escapement mechanism during the periods when the cam plate is moving independently of the spool plate.

11. A motion picture camera comprising a spool carrier plate, a rib extending from said plate having a slot in it substantially the width of a film, means for giving to the carrier plate a step by step motion in the direction of the slot and means on each side of said slot to enable the camera to be used whether as a motion picture camera or as a projecting machine.

12. A motion picture camera comprising a spool carrier plate, a rib extending from said plate having a slot in it substantially the width of a film, a groove in said rib substantially parallel with the slot and a drum extending into said groove to lead a film on to the face of the rib, and tensioning means for holding the film taut over the slot opening.

13. A motion picture camera comprising a spool carrier plate, means for giving to said plate a back and forth motion step by step, a rib on said plate and tensioning means for causing a film to lie flat and taut on the surface of said rib.

14. A motion picture camera comprising a spool carrier plate, means for giving to said plate a back and forth motion step by step, a rib on said plate, a groove on said rib, a film drum extending into said groove, and tensioning means for causing a film to lie flat and taut on the surface of said rib.

15. A motion picture camera comprising a spool carrier plate, a yoke having a guide for said carrier plate, actuating means for the carrier plate mounted on said yoke, a shutter device, and further means mounted on the yoke for operating the said shutter device.

16. A motion picture camera comprising a spool carrier device, a guide for said device, means for moving the carrier device back and forth with a step by step motion, an escapement film winding mechanism and means for tripping the mechanism when the carrier device reaches the extreme limits of its travel, and further means mounted on the carrier device for completing the movement of the escapement trip independently of the said tripping means.

17. A motion picture camera comprising a spool carrier plate, a yoke having a guide for said carrier plate, actuating means for the carrier plate between the yoke and carrier plate and mounted on said yoke, a shutter device, and further means mounted on the yoke for operating the said shutter device.

18. A motion picture camera comprising a spool carrier plate, a guide for said plate, a cam plate having a substantially rectangular rack, a rack pinion, an intermittent drive for said rack pinion, means for holding the pinion to the rack, and further means to enable the cam plate to move integrally with the spool plate in one direction, but independently of said spool plate, on the transverse direction of travel of the cam plate.

Signed at the city of New York in the county of New York and State of New York this 22nd day of September A. D. 1916.

JOSEPH A. GOLDEN.

Witnesses:
HENRY L. SLOBODIN,
RUTH KRAUSS.